US012709980B2

(12) United States Patent
Chen

(10) Patent No.: US 12,709,980 B2
(45) Date of Patent: Aug. 18, 2026

(54) DOWNHOLE DETECTION OF FORMATION AND FLUID PROPERTIES USING QUANTUM SENSOR FOR NMR MEASUREMENTS

(71) Applicant: Halliburton Energy Services, Inc., Houston, TX (US)

(72) Inventor: Songhua Chen, Liberty Hill, TX (US)

(73) Assignee: Halliburton Energy Services, Inc., Houston, TX (US)

(*) Notice: Subject to any disclaimer, the term of this patent is extended or adjusted under 35 U.S.C. 154(b) by 442 days.

(21) Appl. No.: 18/538,899

(22) Filed: Dec. 13, 2023

(65) Prior Publication Data

US 2025/0198283 A1 Jun. 19, 2025

(51) Int. Cl.
*E21B 49/08* (2006.01)
*G01N 24/08* (2006.01)

(52) U.S. Cl.
CPC ....... *E21B 49/0875* (2020.05); *G01N 24/082* (2013.01)

(58) Field of Classification Search
CPC .... E21B 49/0875; G01N 24/082; G01R 33/26
See application file for complete search history.

(56) References Cited

U.S. PATENT DOCUMENTS

| | | | |
|---|---|---|---|
| 9,645,277 B2 | 5/2017 | Edwards et al. | |
| 2004/0119471 A1 | 6/2004 | Blanz et al. | |
| 2010/0019771 A1 | 1/2010 | Gold et al. | |
| 2010/0188080 A1 | 7/2010 | Kruspe et al. | |
| 2016/0305239 A1 | 10/2016 | Hopper et al. | |
| 2025/0035809 A1* | 1/2025 | Chen | G01V 3/32 |

FOREIGN PATENT DOCUMENTS

WO 2015015215 A1 2/2015

OTHER PUBLICATIONS

Degen, C.L. et al., “Quantum Sensing”, Rev. Mod. Phys. 89, 035002—Published Jul. 25, 2017.

Kitching, John, “Chip-Scale Atomic Magnetometers”, https://www.nist.gov/noac/technology/magnetic-and-electric-fields/chip-scale-atomic-magnetometers; Created Jun. 12, 2020, Updated Feb. 22, 2023.

International Search Report & Written Opinion; PCT Application No. PCT/US2023/084049; mailed Sep. 6, 2024.

* cited by examiner

*Primary Examiner* — G. M. A Hyder
(74) *Attorney, Agent, or Firm* — Thomas Rooney; C. Tumey Law Group PLLC

(57) ABSTRACT

Described herein are systems and techniques for improving an accuracy of determinations made using data sensed in a wellbore or in a laboratory. Nuclear magnetic resonance (NMR) sensing devices may be used to collect data in a wellbore or lab. NMR sensing devices include a magnet (e.g., a permanent magnet or electromagnet) that provides a magnetic field that aligns the spins of protons/nuclei in substances near the NMR sensing device. The magnetic field strength provided by the magnet of the NMR sensing device affects the sensitivity of the NMR sensing device and affects frequencies that the NMR sensing device effectively uses when the NMR sensing device operates. Systems and techniques of the present disclosure may measure concentrations of lithium in brine deposits when identifying particular brine deposits that include sufficient lithium concentrations to justify extracting lithium from those particular brine deposits.

20 Claims, 10 Drawing Sheets

DOWNHOLE DETECTION OF FORMATION AND FLUID PROPERTIES USING QUANTUM SENSOR FOR NMR MEASUREMENTS

TECHNICAL FIELD

The present disclosure is generally directed to improving operation of a nuclear magnetic resonance (NMR) device. More specifically, the present disclosure is directed to enhancing the sensitivity of measurements made by an NMR device.

BACKGROUND

Nuclear magnetic resonance (NMR) downhole logging is a technique sometimes used to identify the presence of compounds that include hydrogen in underground formations. One reason for this is that the spins of protons of compounds like oil, natural gas, and water that contain protons are more easily measured by NMR than other compounds or elements, such as sodium, phosphorus, lithium, for example. This is because protons are abundant in oil and gas; their relaxation times in underground formation rocks are not very long, and the receptivity of proton is high compared to other nuclei (e.g., lithium). Minerals like lithium are in high demand and the demand for lithium is anticipated to increase with the demand for electrical components that are made from lithium (e.g., batteries and capacitors). The capability of quantifying underground brine salinity by sodium is a very useful parameter which may be essential for quantifying oil saturation using resistivity based logging. Furthermore, compounds like lithium may be found underground in salt flat or in lithium brine reservoirs, where a wellbore may be drilled for assessing quality and quantity of lithium resource. As such, improving operation of an NMR sensing device could create new utilization of NMR logging for underground mineral logging and reservoir evaluation that proton NMR logging cannot achieve. Even in instances with an NMR device is used to detect hydrogen containing compounds, any improvement in the ability of sensors in the NMR device to sense magnetic fields may improve operation of an NMR device.

BRIEF DESCRIPTION OF THE DRAWINGS

In order to describe the manner in which the features and advantages of this disclosure can be obtained, a more particular description is provided with reference to specific implementations thereof which are illustrated in the appended drawings. Understanding that these drawings depict only exemplary implementations of the disclosure and are not therefore to be considered to be limiting of its scope, the principles herein are described and explained with additional specificity and detail through the use of the accompanying drawings in which.

DETAILED DESCRIPTION

Figure 1A:
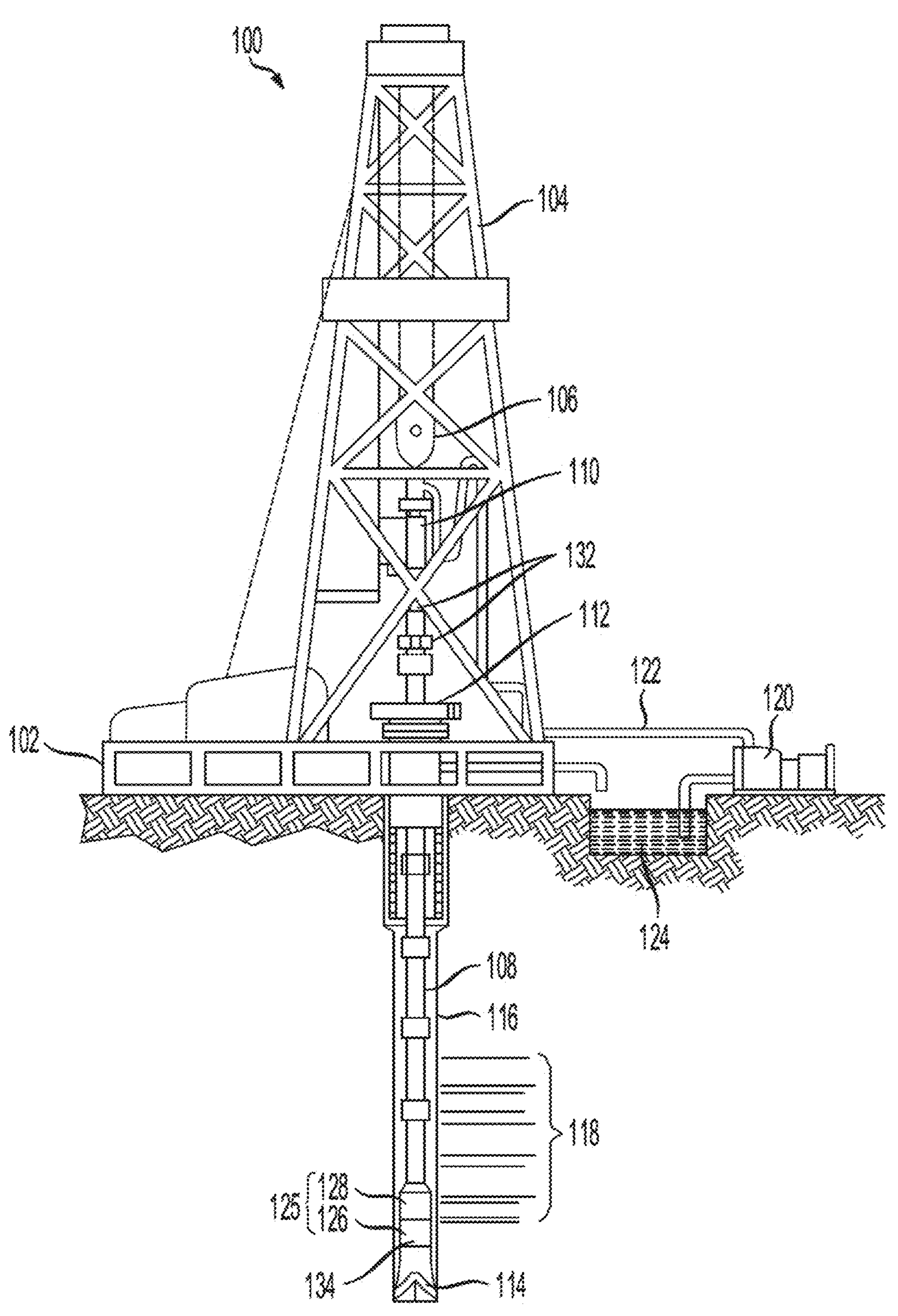
FIG. 1A is a schematic diagram of an example logging while drilling wellbore operating environment, in accordance with various aspects of the subject technology.

Various aspects of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous compounds. In addition, numerous specific details are set forth in order to provide a thorough understanding of the methods and apparatus described herein. However, it will be understood by those of ordinary skill in the art that the methods and apparatus described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the present disclosure.

Described herein are systems, apparatuses, processes (also referred to as methods), and computer-readable media (collectively referred to as "systems and techniques") for improving an accuracy of sensed data and determinations made using data sensed in a wellbore or a laboratory. Nuclear magnetic resonance (NMR) sensing devices may be used to collect data in a wellbore or lab. NMR sensing devices include a magnet (e.g., a permanent magnet or electromagnet) that provides a magnetic field that aligns the spins of protons included in the nucleus of substances near the NMR sensing device. The magnetic field strength provided by the magnet of the NMR sensing device affects the sensitivity of the NMR sensing device and affects frequencies that the NMR sensing device effectively uses when the NMR sensing device operates. Systems and techniques of the present disclosure may measure in identify compounds or elements of various types. These systems and techniques may not only identify the presence of water, oil, natural gas, or lithium in wellbore fluids, they may be used to identify concentrations of these materials in wellbore fluids. For example, the presence and concentration of lithium in wellbore brine may be identified. Such materials may include individual elements of the periodic table or compounds that include combinations of elements.

The greater the magnetic field strength of the NMR sensing device, the greater the sensitivity of the NMR sensing device. In operation, an NMR sensing device applies a magnetic field that aligns the spins protons included in a sample (e.g., a substance(s), a material, a structure, a rock formation, a mixture, mud, fluid, a tool and/or device, an object, an element, matter, a wellbore system and/or component, etc.) that are near the NMR sensing device. Once the protons in the nearby (e.g., within a threshold proximity to the NMR sensing device) sample are aligned, the NMR sensing device may emit (transmits) a set of electromagnetic (EM) signals (e.g., radio frequency (RF) signals) that disrupt these aligned protons. The disruption of these spins may be sensed by a sensor at the NMR sensing device. When the energy emitted by the disrupted protons passes by the sensor, the sensor generates one or more signals that have characteristics that can be evaluated to identify what materials are included in the sample near the NMR sensing device. Systems of the present disclosure may use a set of quantum sensors. Such a set of quantum sensors may include one or more discrete sensors or sensing elements.

While the protons included in some materials are easily detected using an NMR sensing device, other materials are more difficult to detect. For example, materials like water and oil that include hydrogen protons are typically easy to detect, and materials that include lithium may be much more difficult to detect with direct measurement of lithium NMR. Lithium is in high demand today and the demand for lithium is anticipated to increase with the demand for electrical components (e.g., batteries and capacitors) that are made from lithium. What are needed are new methods and systems that detect elements like lithium in materials for resource assessment and for economic recovery of lithium containing minerals.

Quantum sensors or quantum sensing magnetometers of the present disclosure may be made smaller and more sensitive than conventional sensors (e.g., coils of wire). Since quantum sensors are smaller than other types of sensors, quantum sensors will take up less space than these other types of sensors. In certain instances, a plurality of quantum sensors of an NMR sensing device may consume less volume than an inductive sensor.

Examples of the systems and techniques described herein are illustrated in the figures that follow.

FIG. 1A is a schematic diagram of an example logging while drilling wellbore operating environment, in accordance with various aspects of the subject technology. The drilling arrangement shown in FIG. 1A provides an example of a logging-while-drilling (commonly abbreviated as LWD) configuration in a wellbore drilling scenario 100. The LWD configuration can incorporate sensors (e.g., EM sensors, seismic sensors, gravity sensor, image sensors, etc.) that can acquire formation data, such as characteristics of the formation, components of the formation, etc. For example, the drilling arrangement shown in FIG. 1A can be used to gather formation data through an electromagnetic imager tool (not shown) as part of logging the wellbore using the electromagnetic imager tool. The drilling arrangement of FIG. 1A also exemplifies what is referred to as Measurement While Drilling (commonly abbreviated as MWD) which utilizes sensors to acquire data from which the wellbore's path and position in three-dimensional space can be determined. FIG. 1A shows a drilling platform 102 equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, it creates a wellbore 116 that passes through various subterranean formations 118. A pump 120 circulates drilling fluid through a supply pipe 122 to top drive 110, down through the interior of drill string 108 and out orifices in drill bit 114 into the wellbore. The drilling fluid returns to the surface via the annulus around drill string 108, and into a retention pit 124. The drilling fluid transports cuttings from the wellbore 116 into the retention pit 124 and the drilling fluid's presence in the annulus aids in maintaining the integrity of the wellbore 116. Various materials can be used for drilling fluid, including oil-based fluids and water-based fluids.

Logging tools 126 can be integrated into the bottom-hole assembly 125 near the drill bit 114. As drill bit 114 extends into the wellbore 116 through the formations 118 and as the drill string 108 is pulled out of the wellbore 116, logging tools 126 collect measurements relating to various formation properties as well as the orientation of the tool and various other drilling conditions. The logging tool 126 can be applicable tools for collecting measurements in a drilling scenario, such as the electromagnetic imager tools described herein. Each of the logging tools 126 may include one or more tool components spaced apart from each other and communicatively coupled by one or more wires and/or other communication arrangement. The logging tools 126 may also include one or more computing devices communicatively coupled with one or more of the tool components. The one or more computing devices may be configured to control or monitor a performance of the tool, process logging data, and/or carry out one or more aspects of the methods and processes of the present disclosure.

The bottom-hole assembly 125 may also include a telemetry sub 128 to transfer measurement data to a surface receiver 132 and to receive commands from the surface. In at least some cases, the telemetry sub 128 communicates with a surface receiver 132 by wireless signal transmission (e.g., using mud pulse telemetry, EM telemetry, or acoustic telemetry). In other cases, one or more of the logging tools 126 may communicate with a surface receiver 132 by a wire, such as wired drill pipe. In some instances, the telemetry sub 128 does not communicate with the surface, but rather stores logging data for later retrieval at the surface when the logging assembly is recovered. In at least some cases, one or more of the logging tools 126 may receive electrical power from a wire that extends to the surface, including wires extending through a wired drill pipe. In other cases, power is provided from one or more batteries or via power generated downhole.

Collar 134 is a frequent component of a drill string 108 and generally resembles a very thick-walled cylindrical pipe, typically with threaded ends and a hollow core for the conveyance of drilling fluid. Multiple collars 134 can be included in the drill string 108 and are constructed and intended to be heavy to apply weight on the drill bit 114 to assist the drilling process. Because of the thickness of the collar's wall, pocket-type cutouts or other type recesses can be provided into the collar's wall without negatively impacting the integrity (strength, rigidity and the like) of the collar as a component of the drill string 108.

Figure 1B:
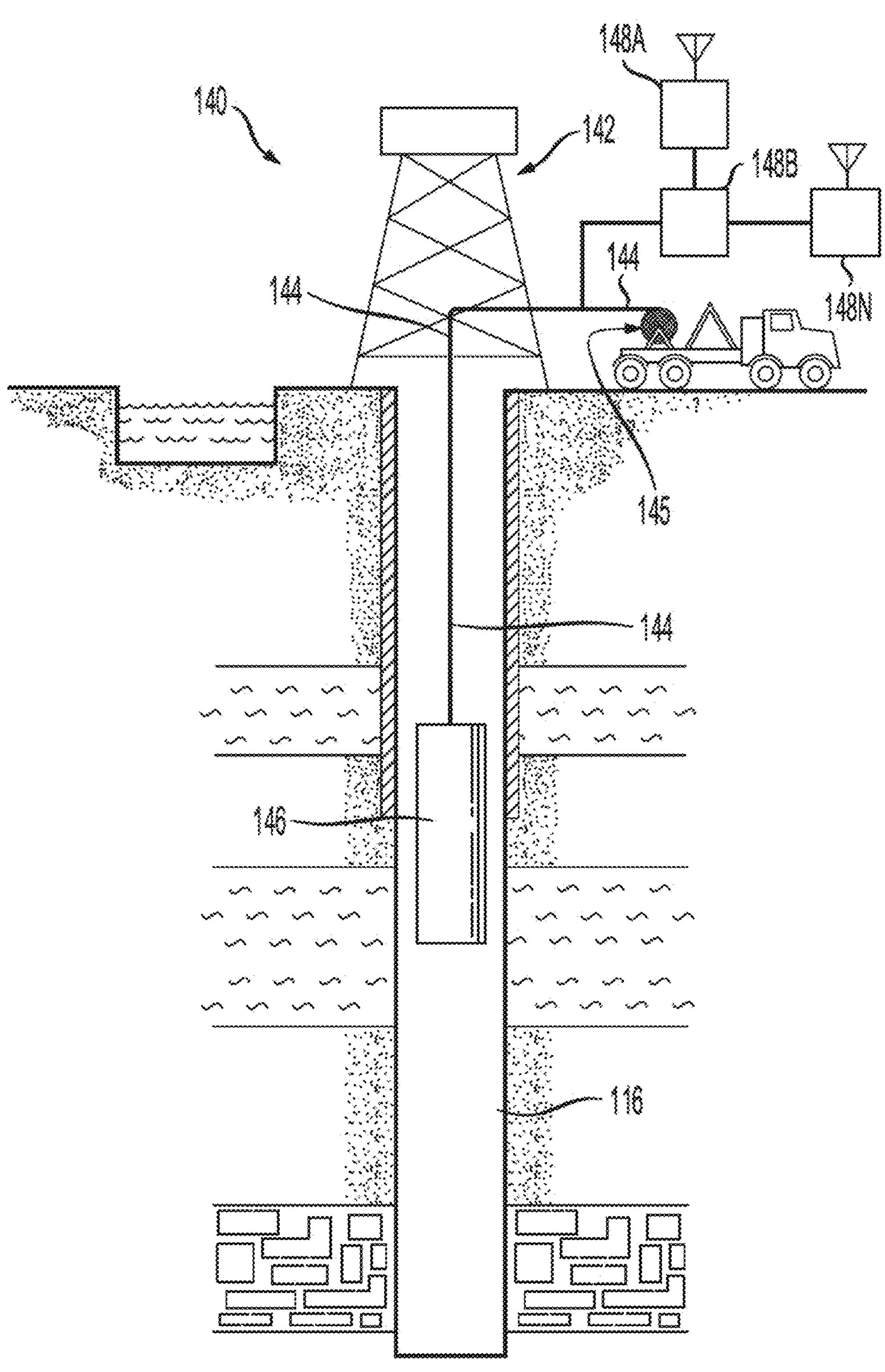
FIG. 1B is a schematic diagram of an example downhole environment having tubulars, in accordance with various aspects of the subject technology.

FIG. 1B is a schematic diagram of an example downhole environment having tubulars, in accordance with various aspects of the subject technology. In this example, an example system 140 is depicted for conducting downhole measurements after at least a portion of a wellbore has been drilled and the drill string removed from the well. An electromagnetic imager tool (not shown) can be operated in the example system 140 shown in FIG. 1B to log the wellbore. A downhole tool is shown having a tool body 146 in order to carry out logging and/or other operations. For example, instead of using the drill string 108 of FIG. 1A to lower the downhole tool, which can contain sensors and/or other instrumentation for detecting and logging nearby characteristics and conditions of the wellbore 116 and surrounding formations, a wireline conveyance 144 can be used. The tool body 146 can be lowered into the wellbore 116 by wireline conveyance 144. The wireline conveyance 144 can be anchored in the drill rig 142 or by a portable means such as a truck 145. The wireline conveyance 144 can include one or more wires, slicklines, cables, and/or the like, as well as tubular conveyances such as coiled tubing, joint tubing, or other tubulars. The downhole tool can include an applicable tool for collecting measurements in a drilling scenario, such as the electromagnetic imager tools described herein.

The illustrated wireline conveyance 144 provides power and support for the tool, as well as enabling communication between data processors 148A-N on the surface. In some examples, wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more of the processors 148A-N, which can include local and/or remote processors. The processors 148A-N can be integrated as part of an applicable computing system, such as the computing device architectures described herein. Moreover, power can be supplied via wireline conveyance 144 to meet power requirements of the tool. For slickline or coiled tubing configurations, power can be supplied downhole with a battery or via a downhole generator.

As mentioned above, one type of equipment that may be used to collect data in a wellbore is a nuclear magnetic resonance (NMR) sensing device. When an NMR sensing device is deployed in a wellbore, a magnetic field provided by a magnet of the NMR sensing device aligns at least some of the protons in materials that are near the NMR sensing device. The spins of protons affected by the magnetic field may align in one of two directions, a first direction, the −½ spin state, that is associated with a first energy state and in a second direction, the +½ spin state, that is associated with a second energy state.

Figure 2:
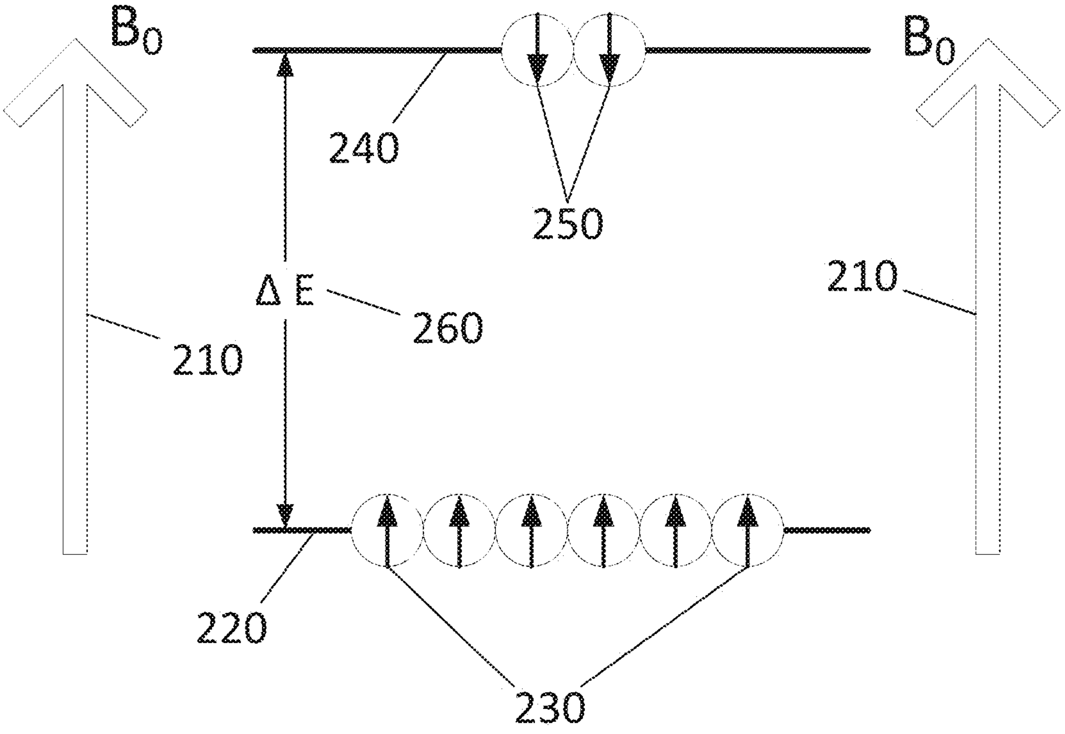
FIG. 2 shows how the directions of spins of protons included in a sample align when exposed to an external magnetic field, in accordance with various aspects of the subject technology.

FIG. 2 shows how the directions of spins of protons included in a sample align when exposed to an external magnetic field. FIG. 2 includes magnetic field 210 that has a field strength $B_0$. When magnetic field 210 is applied to the sample and given sufficient time, affected protons atoms of the sample will align with the magnetic field 210 in either the −½ spin state or the +½ spin state. Protons 230 are illustrated as circles with arrows pointing in an upwards direction, these upward arrows indicate that protons 230 are in the +½ spin state. Protons 250 are illustrated as circles with arrows pointing in a downward direction, these downward arrows indicate that protons 250 are in the −½ spin state. Lines 220 and 240 are energy states respectively associated with spins of protons 230 and 250. A value of energy ΔE (260) that separates the higher energy −½ spin state from the lower energy +½ spin state will increase with a value of applied magnetic field $B_0$. Note that there are more protons at the lower energy +½ spin state (e.g., protons 230) than protons that are at the higher energy −½ spin state (e.g., protons 250). The number of protons 230 at the lower energy state and the number of protons 250 at the higher energy state may correspond to a Boltzmann distribution, where the state distributions of protons at different energy states may vary as a function of temperature. Before a magnetic field is applied to a sample, the spins of protons included in that sample may be randomly distributed and the sample may have a net magnetic field of zero. As mentioned above, when a sample is placed in a magnetic field, at least some protons within the sample will align with the magnetic field. The amount of time it takes for the spins of protons to settle into alignment with the magnetic field (T1 time) may vary based on specific compounds that are included in the sample. Such T1 times are generally referred to spin-lattice relaxation times, longitudinal relaxation times, or alignment times. These T1 times are measures of how quickly a net magnetization vector recovers to alignment in the direction of an applied magnetic field.

While for some compounds like water or oil, illustrative examples of T1 times include three seconds and five seconds or less, this is not typically true for materials that include lithium. In fact, depending on conditions, T1 times for lithium may be much longer (e.g., 10 seconds to over 100 seconds). This means that in certain circumstances and without using methods of the present disclosure, using downhole NMR sensing devices to detect lithium concentrations in underground reservoir or formation may be considered impractical. Techniques of the present disclosure may combine an NMR relaxation time enhancing substance with brines that may contain lithium in order to reduce T1 times and make NMR sensing practical for lithium production.

Figure 3:
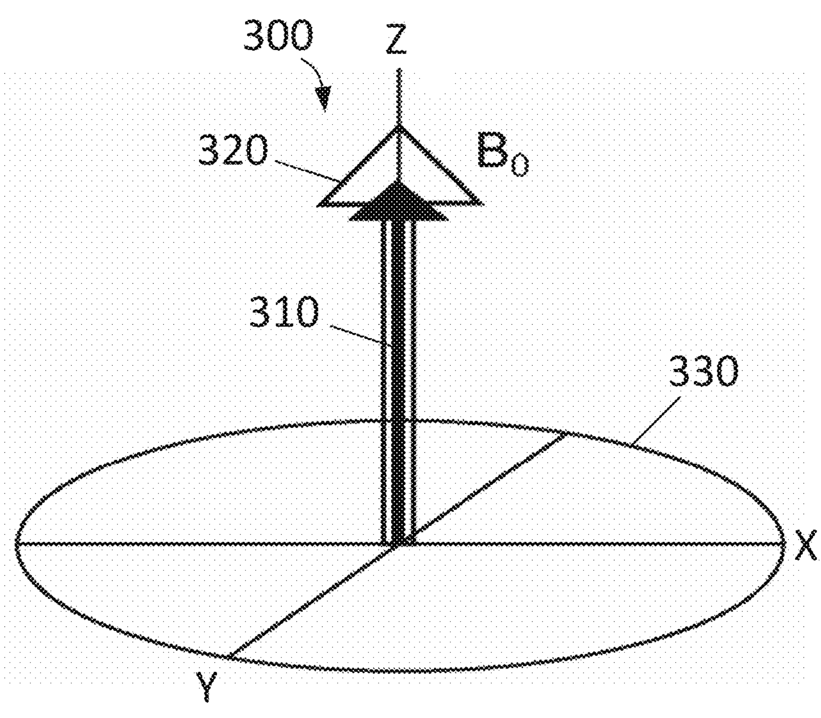
FIG. 3 includes a first image where a magnetic field aligns spins of protons in a sample and includes a second image where the spins of the protons in the magnetic field are disrupted by a radio frequency signal, in accordance with various aspects of the subject technology.
Figure 3:
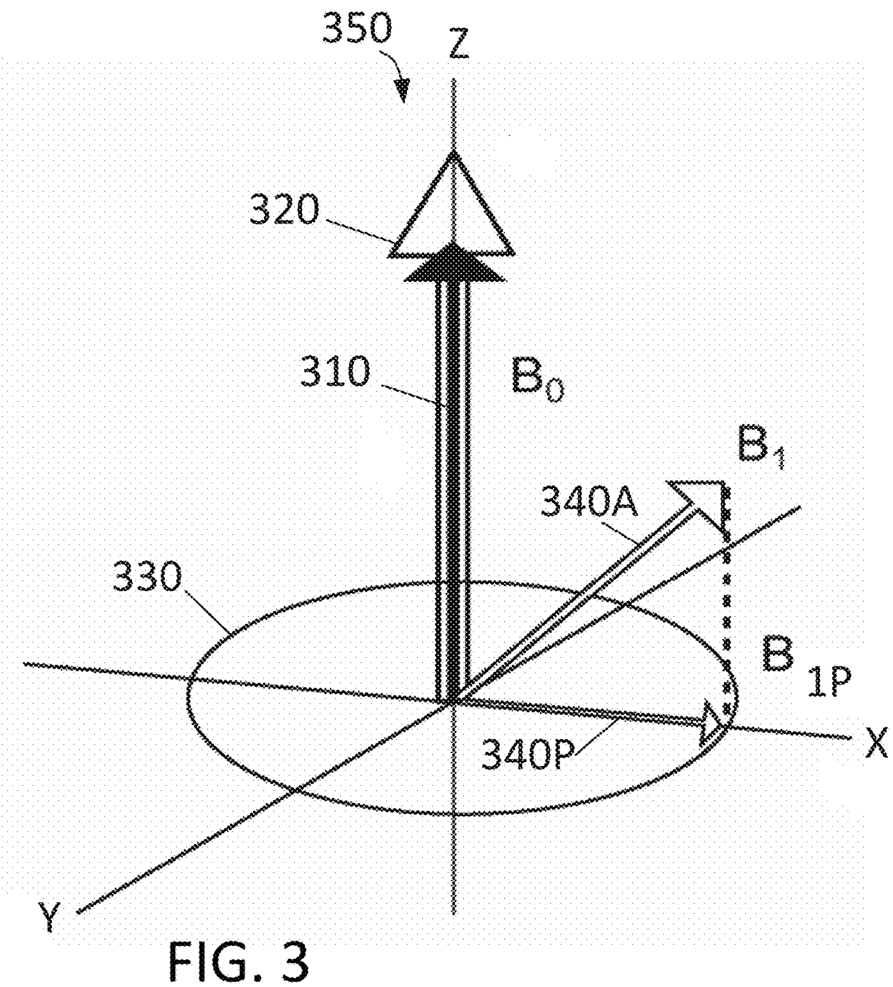

The transitions between the discussed in respect to FIG. 2 may be characteristic of proton NMR, where spins of sensitive protons of hydrogen atoms ($^1H$) are detected. Techniques of the present disclosure may be directed to non-proton NMR. Non-proton NMR is focused on detecting changes in spins (polarizations) of nuclei that include more than one proton. For example, non-proton NMR may be used to detect changes in spins of sodium 23 ($^{23}Na$), lithium 7 ($^{17}Li$), or fluorine 19 ($^{19}F$). Nuclei that include more than one proton may have spin states that are different than ½ and −½. For example, some nuclei may have a spin number that is greater than ½ and nuclei may have more than two energy levels. The spins of protons or nuclei may be referred to as nuclear spins. A nuclear spin of a selected element may only resonate when stimulated with a frequency that the selected element is sensitive to. For a given element, this resonate frequency may be identified using the formula ΔE=h*ν, where ΔE is the energy difference between quantum states (e.g., the quantum states discussed in respect to FIG. 2) of the particular element, h is Planck's constant, and ν is the frequency of an electromagnetic wave (e.g., RF frequency) use to stimulate a sensitive volume where the selected element resides. FIG. 3 includes two different images, a first image where spins of protons or nuclei (nuclear spins) of a sample are aligned with an applied magnetic field and a second image where nuclear spins of the sample are disrupted by radio frequency (RF) signals transmitted by an NMR device. FIG. 3 includes image 300 where applied magnetic field 310 of field strength $B_0$ is used to align the nuclear spins in a sample parallel to the Z axis of image 300. A magnitude of vector 320 in image 300 may correspond to net total parallel magnetic moment of protons or nuclei and total anti-parallel magnetic moment of protons or nuclei. Image 300 also includes an X axis and a Y axis that form plane 330.

After the nuclear spins included in the sample are aligned with applied magnetic field 310, RF signals may be emitted by the NMR sensing device. Magnetic fields associated with these RF signals may disrupt the nuclear spins in a sample. A greater amount of energy of an RF pulse will result in a greater disruption of the nuclear spins. The amount of disruption in these spins may vary with a duration of the RF signal, the frequency of the RF signal, or with RF signal amplitude. Image 350 illustrates an instance where the net magnetic moment of spin is rotated with an offset angle from this Z axis as indicated by vector 340A. An angle associated with a change in spin direction may be referred to as a tipping angle. Sensors at the NMR sensing device sense changes in the nuclear spins by measuring changes in electromagnetic fields along plane 330 may be referred to as RF field B1, 340P is the corresponding component perpendicular to B0, which is responsible for tipping nuclear spins.

RF signals with different energies may be used to disrupt the nuclear spins by different amounts. The transmission of a first RF signal toward a sample may result in the angles of nuclear spins in the sample being changed by 90 degrees. As such, this first RF signal may be classified as a 90 degree RF signal pulse (or excitation pulse) that induces a 90 degree tipping angle. Similarly, the transmission of a second RF signal toward the sample may result in the angles of nuclear spins in the sample being changed by 180 degrees. Because of this, the second RF signal may be classified as a 180 degree RF signal pulse (or refocus pulse) that induces a 180 degree tipping angle. Since the tipping angle varies with RF signal energy, the 90 degree RF pulse may be twice as long or have twice the amplitude of the 180 degree pulse when tipping angle varies linearly with applied RF signal energy. NMR sensing devices may use other types of RF signal pulses. For example, a type of signal pulse that depolarizes (or randomizes) nuclear spins may be referred to as a chirp.

Operation of an NMR sensing device may include aligning nuclear spins in an applied magnetic field for a period of time, transmitting one or more RF signal pulses, and making one or more measurements by the NMR sensing device. This process may be repeated using different lengths of time (different time periods). Once data is collected, evaluations may be performed to identify materials that are present in the sample. Particular materials may be identified based on known correspondences between the transmitted RF signal pulses and the measurements made by the NMR sensing device.

In physics, the gyromagnetic ratio of a particle or system is the ratio of its magnetic moment to its angular momentum. Different nuclei have different gyromagnetic ratios. For the same magnetic field strength, resonant frequencies of these nuclei are proportional to gyromagnetic ratio. Because of this, nuclei of materials that include hydrogen will have a different resonant frequency than nuclei of a material that include lithium.

Chemicals and chemical compounds may have different NMR characteristics, such as T1 and/or T2 times, for different species of nuclei. For a same type of nucleus in a different compound and in a different environment (such as bulk brine vs brine in the pore space of a rock formation), temperature of the underground formation, existence of paramagnetic minerals, etc., can have different T1 and T2 responses. Because of this, NMR devices may be used to identify compounds that are located at specific wellbore locations and may identify characteristics of subterranean formations, such as pore size, porosity, permeability, temperature, or pressure from collected data. Conditions that occur in a wellbore may include temperatures and pressures that are significantly different than conditions at the surface of the Earth. For example, the temperature inside a wellbore may be 150 degrees Celsius (C) when a surface temperature is 25 C. Because of the various temperature related effects that affect operation of an NMR sensing device and since NMR sensing devices are used in wellbores where temperature varies, an NMR sensing device may be calibrated before being used to collect wellbore data.

Techniques of the present disclosure may include detecting threshold level concentrations of lithium contained in fluid (e.g., brine) deposits that may include lithium. In some instances, an NMR device may be deployed in a wellbore. In other instances, samples may be tested in a laboratory.

Naturally occurring lithium is composed of two stable isotopes: lithium six ($^6$Li) and lithium seven ($^7$Li). The ratio of these two lithium isotopes in a reservoir should be consistent to the natural abundance of these isotopes, which is about 7.5% $^6$Li and 92.5% $^7$Li. Furthermore, $^7$Li is more suitable than $^6$Li for downhole NMR measurements, because of its much higher natural abundance of $^7$Li. Furthermore, $^7$Li has greater NMR receptivity than $^6$Li.

In NMR spectroscopy, the term receptivity refers to how detectable a particular isotope is. Some isotopes are easily detected whereas other isotopes are less detectable. Typically, the receptivity of an isotope is a function of the abundance of the isotope's NMR-responsive isotope and that isotope's gyromagnetic ratio. Some isotopes have large gyromagnetic ratios but low abundance. Other isotopes are highly abundant yet have low gyromagnetic ratios. The gyromagnetic ratio (γ) of a particle or system is the ratio of the particle's magnetic moment to the particle's angular momentum.

An NMR resonance frequency ratio of $^7$Li versus $^1$H and $^6$Li versus $^1$H is 38.86% and 17.71%, respectively. This means that the receptivity of $^7$Li versus $^1$H and $^6$Li versus $^1$H correspond to 0.271 and 0.000641, respectively. $^6$Li and $^7$Li spin numbers are 1 and 3/2, respectively. The magnetic field strength of a downhole NMR logging tool is limited by the permanent magnet strength, and, thus, is limited by the borehole size and the magnet material. Given the same magnetic field, the relative intensity $$\left(f_0^3 \cdot I(I+1)\right)$$

of NMR logging with $^7$Li is 422× more responsive than that of $^6$Li. Therefore, $^6$Li may not be suitable for downhole NMR measurement evaluations.

Even though the receptivity of $^7$Li is significantly better than $^6$Li, downhole logging detection and quantification of lithium content still faces significant challenges, mainly due to the weak NMR signal associated with detecting lithium by an NMR device. First, the concentration of lithium in underground brine reservoirs or salt flats is relatively low compared to protons or even sodium in brine at its native environment. Second, although a receptivity of $^7$Li is reasonably high, the spin lattice relaxation time (T1) of several lithium compounds may be in the range of tens of seconds, or even hundreds of seconds. These long T1 times may make it impractical to use repetition measurements to increase the signal-to-noise ratio (SNR) because doing so would take more time than is cost effective. As such, improvements in NMR technology are needed. Quantum sensor of the present disclosure provide one way to improve operation of NMR sensing devices.

In some instances, a relaxation rate enhancer may be used to improve SNR. An example equation for an NMR device SNR can be expressed using Equation (1) below:

Signal to Noise Ratio Equation — Equation (1)

$$S/N \propto (\gamma B_0)\left[\frac{\gamma^2\hbar^2 B_0 N_s}{16\pi^2 kT}\right]\left[\frac{B_1}{i}\right]\left[\frac{1}{V_{noise}}\right]$$

Here, $B_0$ is the magnetic field strength, The first factor ($\gamma B_0$) relates to the induced voltage, which is proportional to $B_0$. The symbol $\gamma$ included in Equation (1) is gyromagnetic ratio of a substance that the NMR device may be configured to sense. The gyromagnetic ratio of $^7$Li is greater than $^6$Li.

The second factor of Equation (1), $$\left[\frac{\gamma^2\hbar^2 B_0 N_s}{16\pi^2 kT}\right]$$

is a net magnetic polarization, where $N_s$ is the number of nuclei (in this case $^7$Li) in the sample, k is Boltzmann's constant, and T the absolute temperature. The third factor, $$\left[\frac{B_1}{i}\right],$$

is detector sensitivity that is a function of the RF magnetic field, $B_1$, produced per unit of input current, i. The final factor, $$\left[\frac{1}{V_{noise}}\right],$$

is the random thermal noise voltage which has contributions from both the sample and detector. Equation (1) may be rearranged by eliminating constants and temperature dependence. As such, Equation (1) may be rewritten as Equation (2) below:

Simplified Signal to Noise Ratio Equation — Equation (2)

$$S/N \propto \frac{N_S\gamma^3 B_0^2 B_1}{V_{noise}}.$$

As discussed above, the larger spin number and higher natural abundance of $^7$Li as compared to $^6$Li collectively may make a scientist or engineer tune the NMR device to detect $^7$Li instead of $^6$Li. For a given detector, the random thermal noise voltage can be reduced by repeating response measurements. Assuming in a given time interval/time, $t=\Delta T$, the maximum number (n) of repeats is governed by the $^7$Li spin relaxation time T1 can be is approximated using Equation (3) below:

$$n \approx \frac{\Delta T}{3T_{1_{7Li}}}$$

Equation (3): Number of Repeat Measurements Per Test Time Interval Equation

An amount of noise voltage reduction with n repeats may correspond to a factor of $\sqrt{n}$. Thus, Equation (3) can be rewritten as Equation (4) below:

Noise Reduction Equation — Equation (4)

$$SNR(\Delta T) \propto N_s\gamma^3 B_0^2 B_1\sqrt{T_{1\_7Li}}$$

Thus, a method to reduce $T_{1\_7Li}$ can increase SNR. Since lithium is a weak quadrupole which relaxes slowly, lithium has a long polarization time, commonly in the order of magnitude of seconds. In order to reduce the relaxation time of $^7$Li, a paramagnetic relaxation time enhancing element (an NMR relaxation enhancement agent) may be used to increase sensitivity. An observed $T_1$ relaxation time may be reduced with the presence of a relaxation time enhancing element as described by Equation (5):

Enhanced Relaxation Time Equation — Equation (5)

$$\frac{1}{T_1^{obs}} = \frac{1}{T_1^{native}} + \frac{1}{T_1^{enhancer}}$$

In such an instance, a value of $$\frac{1}{T_1^{enhancer}} = \rho_1[C],$$

where [C] and $\rho_1$ respectively refer to a concentration and relaxivity of the relaxation time enhancer. The type of relaxation time enhancer suitable for the stated purpose is paramagnetic chemical agent which either dissolves or mixes well with brine. For example, a positive magnetic resonance (MR) contrast agent used in magnetic resonance imaging (MRI) diagnosis may be selected for this purpose.

Equation (2) above shows that SNR is proportional to applied magnetic field $B_0$ so increasing a static magnetic field applied to a sensitive volume (e.g., a material being evaluated) is one way of increasing SNR. The NMR sensitive volume, located inside rock formation may be several inches away from the tool surface. As the static magnetic field is inversely proportional to the distance x from the magnet, a magnetic field B0 applied to the sensitive volume at a distance x from the magnet of an NMR device corresponds to Equation (6):

Magnetic Field vs Distance Equation Equation (6)

$$B_0(x) \approx \frac{A}{x^s}$$

The farther the sensitive volume is away from the tool, the weaker the magnetic field. In Equation (7), A is a quantity that is dependent on the magnet configuration realization and magnetic field strength of the permanent magnet, s is also a quantity that depends on the magnet configuration. Approximately in the range of 2-3, x is the distance of the sensitive volume to the center of the magnet source. It is noted that an exact equation form of the distance-dependent magnetic field strength may be more complicated and may be determined numerically using finite element analysis, based sensor simulation. For the current purpose, Equation (7) may be used to explain an inventive step of the present disclosure. If we can reduce x by a factor of a, the SNR can be boosted by $a^{2s}$. For instance, if a=2 and s=2, the SNR can be increased by a factor of 16. Furthermore, the RF signal field strength B1 also varies nonlinearly in a manner that is inversely propositional to a distance between an RF signal transmission coil and the NMR sensitive volume. From Equations (1), (2), or (4), we can expect the SNR increase proportionally. These equations show that SNR is proportional to B1, while B1 is nonlinearly inversely proportional to the distance from a of transmission coil to the sensitive volume. Thus, when the distance between the transmission coil and sensitive volume is reduced, one will expect that the B1 decreases, as such SNR proportionally increases as B1 increases. Today, based on the science of quantum mechanics, new types of sensors, referred to as quantum sensors or atomic sensors are being developed. Materials used to make a quantum sensor must be sensitive to quantum effects. One type of material that demonstrates quantum effects are molecules of diamond that include a defect in their lattice structure. An example of a lattice that exhibits quantum effects is a diamond molecule that has a vacancy and a nitrogen atom in the lattice instead of carbon atoms in each bond point of the diamond lattice. Such a lattice configuration is referred to as a nitrogen vacancy (NV) in diamond lattice. Like diamond, other types of materials may exhibit quantum be sensitive to quantum effects when those other types of materials have similar lattice defects. As such, quantum sensors are not limited to diamond molecules that have a nitrogen vacancy in their lattice. This also means that various types of materials could potentially be exploited based on their quantum sensitivities. For example, in the future defective lattice structures in silicon carbide, lithium niobate, aluminum nitride, germanium, silicon nitride, boron nitride, and potentially other materials may be used in quantum sensors.

NV diamond lattices as well as other similar defective lattices are sometimes sensitive to electromagnetic (EM) photons (e.g., radio frequency (RF) or light photons) passing into the lattice of a diamond molecule. In instances when a photon is absorbed, states associated with that photon may be identified. Whether or not a particular photon is absorbed by a lattice may be associated with features of the lattice and the frequency of the photon. For example, photons of a certain color or radio frequency may be absorbed by the lattice when photons of other colors or radio frequencies are not. As such, a photon may pass through the lattice or the photon may be absorbed by the lattice. The absorption energy from the photon by a lattice may correspond to a resonate frequency of the lattice. As such, by observing the resonance of the lattice, determinations regarding the spin state or other states of the photon may be identified. One method for observing such resonances is by monitoring a lattice with a laser.

Quantum illumination is the use of quantum effects that may include quantum entanglement. Quantum entanglement may be used to enhance the resolution of detection systems. Systems and techniques of the present disclosure may use quantum illumination to increase the resolution of a ground penetrating radar (GPR) apparatus, quantum networks may be formed when multiple quantum devices communicate or otherwise transfer data, and techniques of the present disclosure may use quantum detectors to collect data regarding subterranean structures in the vicinity of a wellbore.

These effects may be similar to processes that describe the photoluminescence effect of certain compounds. Photoluminescence relates to energy from photons of electromagnetic radiation being absorbed by a compound that initially increases the energy level of electrons in the compound. When these stimulated electrons fall back to their original energy state, the compound emits light. This may include a light photon impacting a lattice of a sensing element, the light transferring energy into the lattice which result in energy states of electrons in the lattice increasing. Momentum of the stimulated electrons may then reduce, resulting in their energy being released by the lattice in the form of light. In certain instances, the absorption of electrons or photons with frequencies other than those frequencies commonly associated with light may create a similar effect that may be referred to as an electromagnetic-luminescence effect. For example, RF photons being absorbed could result in light photons being emitted.

In certain instances, quantum amplifiers may be used in devices of the present disclosure. One example of a quantum amplifier is a Johnson junction amplifier (JPA) another is a quantum linear amplifier (QLNA). As such, techniques of the present disclosure may include receiving an RF photon, providing those photons to an amplifier, and then the amplified photons may be transmitted without destroying coherence of entangled photons.

The concept of quantum detection within this context leverages the fascinating properties of defect centers in crystal lattices, such as nitrogen vacancy (NV) centers in diamond. NV centers are essentially spots in the diamond lattice where a nitrogen atom replaces a carbon atom and an adjacent lattice site is vacant. Defective lattice structures that include NV centers or other forms of similar defects possess unique electronic properties that can be manipulated and detected optically. They serve as highly sensitive quantum sensors, enabling the detection and processing of single photons. The sensor chip uses these NV centers to mix a photon (e.g., an RF photon) that retains the entanglement of an original optical probe photon, with an on-chip idler photon. This process may be used as a quantum detection mechanism. Furthermore, the combination of the RF photon and optical idler photon brings an additional advantage: the possibility of using silicon-based (or other types of semiconductor based) detectors. Semiconductor detectors offer numerous benefits for a quantum system, including low noise, high speed, and temperature resistance, all crucial parameters for reliable operation in the harsh wellbore environment. Thus, this ingenious application of NV centers and silicon detectors facilitates highly sensitive and efficient quantum detection, a potential cornerstone of a sensor network proposed in the present disclosure.

Some quantum devices are capable of detecting electrons. For example, sensors that include n-type and p-type semiconductor materials may generate electrical signals when those sensors are impacted by electrons. Such sensors may be used in applications like electron microscopy. As such, devices that use light photons, RF photons, and/or electrons may be used in quantum sensing applications.

To detect the returned signal photons, quantum detectors, which operate on principles of quantum mechanics, may be incorporated into the sensor design. These detectors offer exceptional sensitivity and can detect individual photons, the smallest units of light. Their high sensitivity, combined with the low-power operations of the quantum illumination process, facilitates the creation of an efficient, low-power sensing system. This low-power operation is critical in enabling the energy harvesting technologies or long-life power sources that the sensor network relies on. This integration of quantum illumination, quantum networks, and quantum detectors, along with RF emission for communication, paves the way for an advanced sensor network capable of revolutionizing subsurface reservoir monitoring and management.

Quantum detectors may be configured to receive electromagnetic energy from one point to another or from one point to many points serially or in parallel, depending on particular techniques and devices that are used. In certain instances, a quantum detector may be a semiconductor device that may include semiconductor materials that are coupled to a detection circuit.

Figure 4:
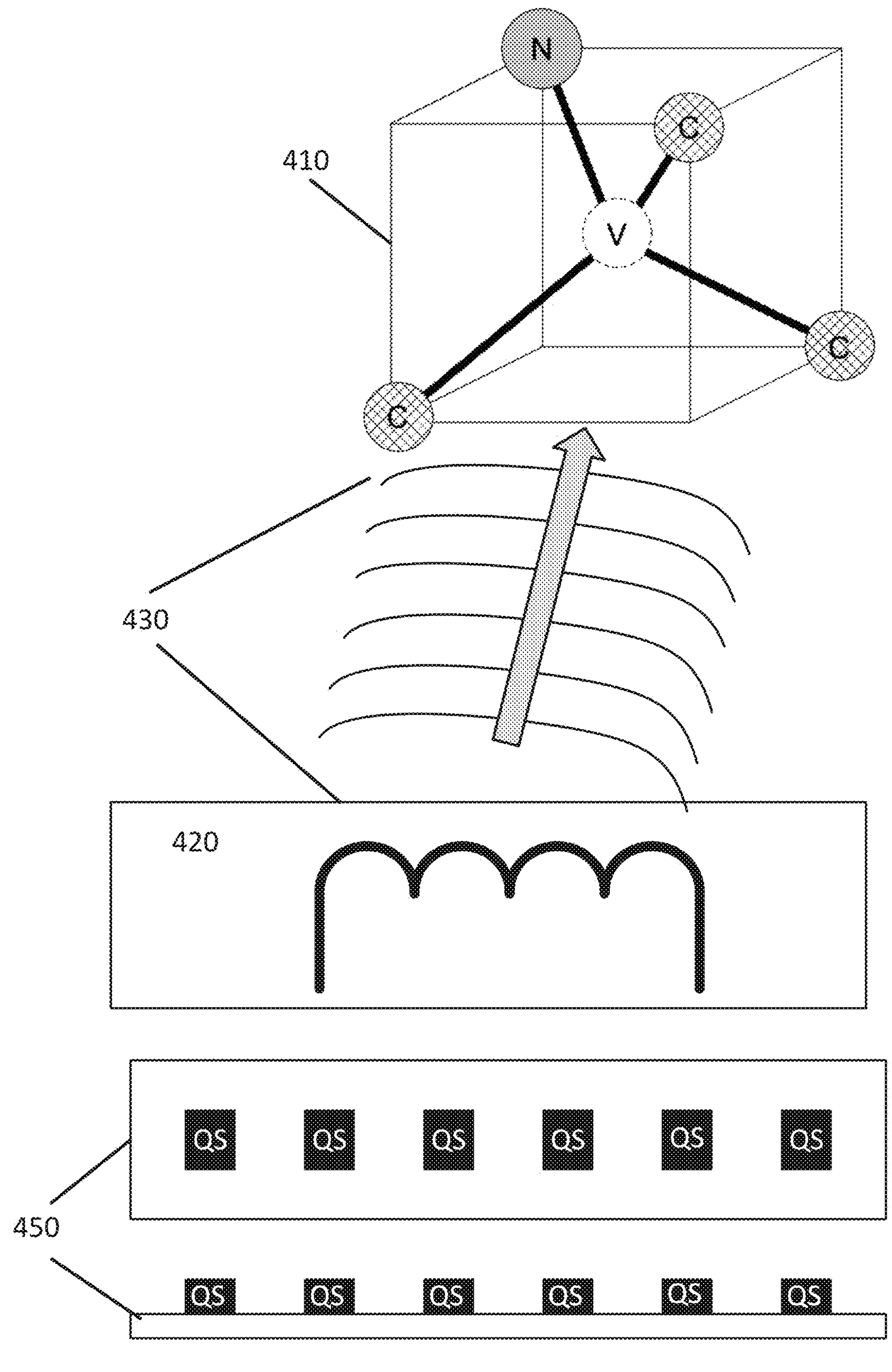
FIG. 4 illustrates configurations of quantum sensors that may be affected based on an electromagnetic signal emitted by a transmission coil of a nuclear magnetic resonance (NMR) sensing device, in accordance with various aspects of the subject technology.

FIG. 4 illustrates configurations of quantum sensors that may be affected based on an electromagnetic signal emitted by a transmission coil of a nuclear magnetic resonance (NMR) sensing device. The nitrogen vacancy diamond lattice 410 may be included in a quantum sensor. Lattice 410 may be influenced by electromagnetic field 430 emitted by transmission coil 420.

Lattice 410 or other sensing elements that exhibit quantum effects or that are affected by electromagnetic fields may be incorporated into a quantum sensor. Such quantum sensors may be integrated into an electronic/electrical printed circuit board. This may include soldering an array of quantum sensors onto circuit board 450. FIG. 4 includes a top view and a side view of circuit board 450 onto which a plurality of quantum sensors QS are mounted. Circuit board 450 may be part of a structure used to dispose quantum sensors QS in proximity to a magnet and to electromagnetic field transmitters/emitters such as coil 420. NMR devices may include one or more emitters (e.g., coils) and one or more quantum sensors QS.

Figure 5:
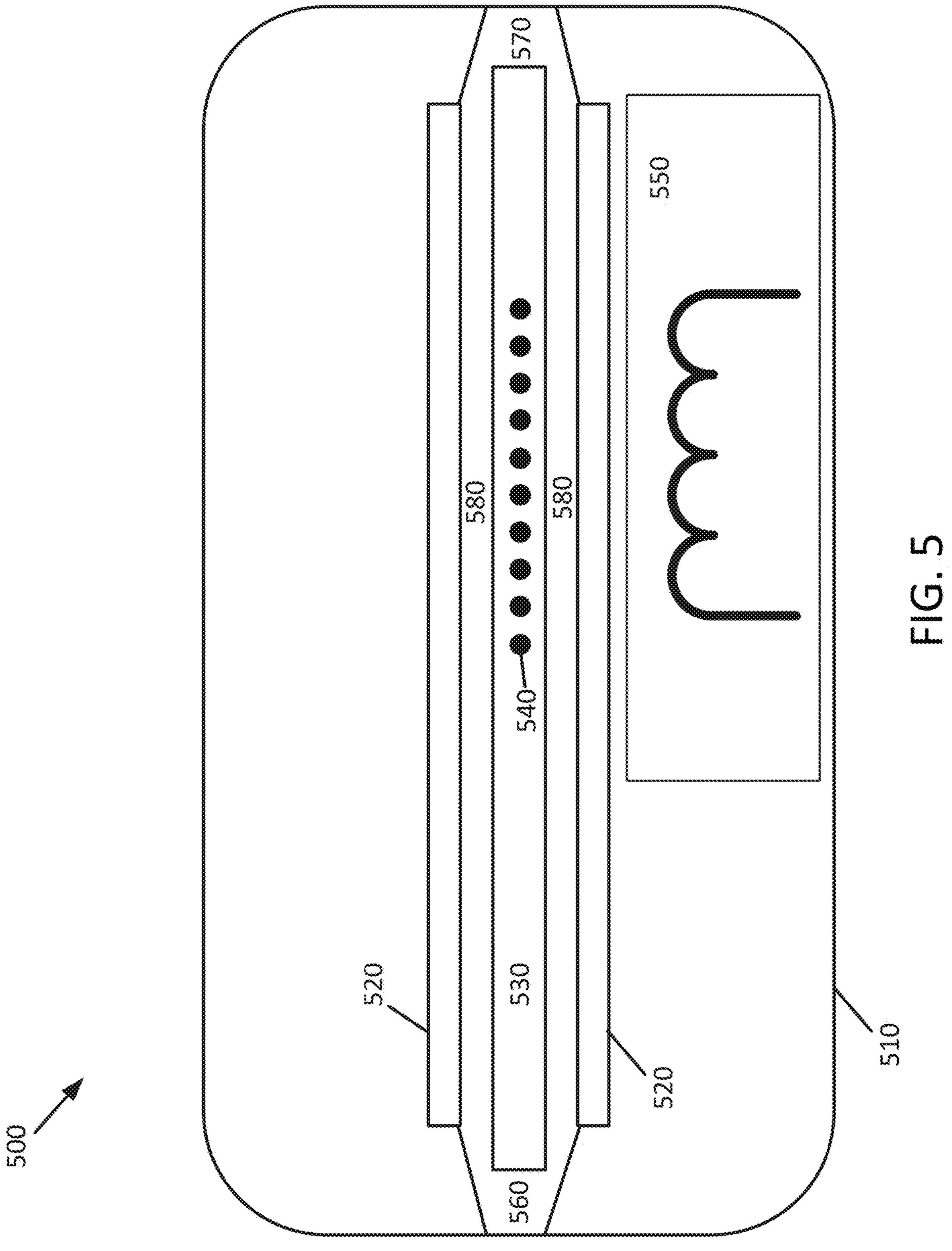
FIG. 5 illustrates a nuclear magnetic resonance sensing device that includes an array of quantum sensors, in accordance with various aspects of the subject technology.

FIG. 5 illustrates a nuclear magnetic resonance (NMR) sensing device that includes an array of quantum sensors. FIG. 5 includes a first structure 510 that contains magnets 520, a second structure 530 onto which the array or set of quantum sensors 540 are attached or integrated into, and coil 550. Each of the ten dark circles included in FIG. 5 may be an individual quantum sensor, as such quantum sensor array 540 may include ten quantum sensors. In certain instances, fluids contained within a wellbore may enter NMR sensing device 500 via a port that may be located at the left side 560 of NMR sensing device 500. These wellbore fluids may exit NMR sensing device 500 via a port that may be located at the right side 570 of NMR sensing device 500. Nuclear spins of compounds dissolved in or transported by wellbore fluid may be aligned by magnetic fields emitted from magnets 520. Coil 550 may emit pulses of EM energy such that sensors 540 may sense disruptions to the nuclear spins of the compounds dissolved in or transported by the wellbore fluid. Data sensed by sensors may then be evaluated, for example by a computer, to identify the compounds dissolved in or transported by wellbore fluid. As such compounds located in an area 580 between magnets 520 and quantum sensors 540 may be identified. Area 580 may be referred to as a location where a sensitive volume of a sample.

Even though the array of quantum sensors 540 in FIG. 5 are arranged in a geometric pattern of a line, any number of quantum sensors (one or more) may be used and these quantum sensors may be arranged in any geometric pattern that a designer of an NMR sensing device wishes to use. Examples of geometric patterns include a point (using one sensor), a circle, a rectangle, or sensors may be aligned parallel to one axis or several axes.

Distances between magnets 520, the second structure 530, and coil 550 may be controlled based on the design of NMR sensing device 500. In operation, fluid entering via the port at the left end 560 of NMR sensing device 500 may have nuclear spins aligned based on a magnetic field provided by magnets 520. After the nuclei of the fluid are exposed to the magnetic field provided by magnets 520 and when the fluid is in proximity of quantum sensors 540, pulses of electromagnetic (EM) energy may be transmitted by coil 550, and quantum sensors 540 may sense disruptions to the nuclear spins.

While FIG. 5 includes area 580 located on the inside of an NMR sensing device, quantum sensors may be arranged near an outside portion of the NMR sensing device such that compounds located next to the NMR sensing device may be identified.

While not illustrated in FIG. 5, quantum sensors may be configured to couple sensed signals to electronics. In certain instances, these signals may be sampled by an analog to digital converter (ADC) and a processor may perform evaluations on data received from the ADC. These evaluations may allow the processor to identify patterns associated with the data and may allow the processor to identify compounds included in the wellbore fluid (or sample) from the patterns.

Figure 6:
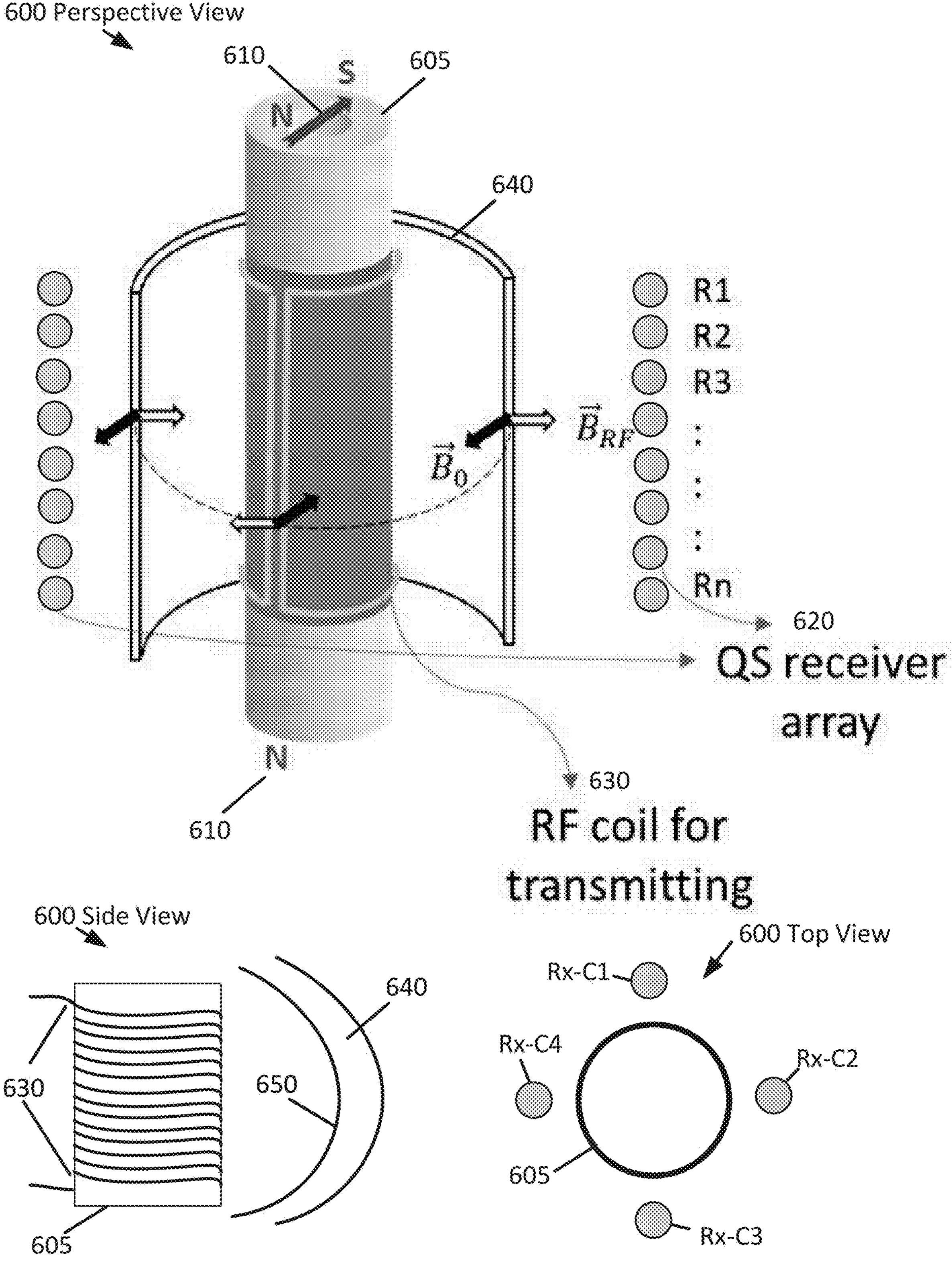
FIG. 6 illustrates a nuclear magnetic resonance sensing device that includes a set of quantum sensors, in accordance with various aspects of the subject technology.

FIG. 6 illustrates a nuclear magnetic resonance (NMR) sensing device that includes a set of quantum sensors. In an upper portion of FIG. 6 a perspective view of NMR device 600 is shown. The NMR sensing device 600 of FIG. 6 includes magnets that form a magnetic field $B_0$ that may have a North pole N and a South pole S as indicated by vector 610. NMR sensing device may also include quantum sensor/receiver array 620, and a radio frequency (RF) transmitting coil 630 that may be wrapped around a central portion 605 of NMR sensing device 600. Magnet field 610 may align (polarize) the spins of nuclei of a sample being evaluated by NMR sensing device 600. When RF transmitting coil 630 emits pulses, those pulses may have a magnetic field $B_{RF}$ and distribution to the nuclear spins of the sample may be sensed by quantum sensors 620. Note that the perspective view of NMR sensing device 600 includes two columns of quantum sensing elements that may be aligned in parallel with each other. Here each respective quantum sensor is assigned a "row" reference number R1, R2, R3, through Rn. Because of this, each sensor of NMR sensing device 600 may be identified using a column reference number (C1 through Cn) and a row reference number (R1 through Rn).

As discussed in respect to FIG. 5, the quantum sensors 620 of FIG. 6 may be coupled to electronics that perform evaluations on sensed data such that materials included in a sample may be identified. The perspective view of NMR sensing device 600 also shows area 640 that may be where a sensitive volume of elements that NMR sensing device 600 is evaluating. As mentioned above, sensitive volumes may be located within an NMR sensing device or in an area around an outside portion of the NMR sensing device. As such, NMR sensing devices may pass fluids as discussed in respect to FIG. 5 or may be used to collect data regarding elements in a wellbore or near a wall of a wellbore.

A side view of NMR sensing device 600 located in the lower left corner of FIG. 6 illustrates wires of coil 630 wrapped around the central portion 605 of NMR sensing device 600 and shows electromagnetic field 650 emitted from coil 630. An area where electromagnetic field 650 extends may correspond to locations where the sensitive volume 640 is located. As such, sensitive volume 640 may have a correspondence to the length of coil 630. As such, the length of an NMR transmission coil may be considered to be the aperture of an antenna of an NMR sensing device.

A cross-sectional top view of NMR sensing device 600 included in FIG. 6 shows the internal portion 605 of NMR sensing device 600 surrounded by an array of quantum sensors Rx-C1, Rx-C2, Rx-C3, and Rx-C4, where the x may refer to a specific row (R1 through Rn) of four columns (C1 through C4) of quantum sensors. The row of quantum sensors may be any of a plurality of rows R1 through Rn of quantum sensor array 620. As such, each specific quantum sensor may be identified using a row number and a column number in the form of Rx-Cy or in a column/row form of Cy-Rx.

The quantum sensors of NMR sensing device 600 may be placed 90 degrees apart as shown in the top view of FIG. 6. This may allow NMR sending device 600 to detect substances heterogeneity in the same formation layer when vertical wellbore logging is performed. Furthermore, quantum sensors (atomic magnetometers) may be installed in multiplication, for example azimuthally or along an axial dimension of NMR sensing device 600 to obtain both heterogeneity in formation layers and high-resolution mappings. Instead of using one relatively large inductive element to sense NMR signals, NMR sensing devices of the present disclosure may use numerous quantum sensors that are distributed over an area that is smaller than an area consumed by the relatively larger inductive element. A sensitive volume may be dependent on not only the coil geometry but also the magnetic fields associated with an NMR sensing device. This means that the sensitive volume may be dependent on a magnetic field of an emitted RF signal and a static magnetic field of magnets included the NMR device. The sensitive volume may be dependent on a shape, an amplitude of an RF pulse, and a duration of an RF pulse/pulse sequence.

In a mandrel type NMR tool, the sensitive volume has a geometry substantially close to a ring cylinder (e.g, inner portion 605 of NMR sensing device 600). In such an instance, the sensitive volume geometry may be substantially close to a crescent cylinder (e.g., sensitive volume 640 of FIG. 6) because it is configured to be a side-looking tool. While the spatial resolution of a quantum sensor is not necessarily identical to a linear dimension of the atomic sensor. The small size of the quantum sensor will sense signals from a small volume in the vicinity of the quantum sensor, and therefore a quantum sensor should have a higher resolution than is capable of conventional inductive sensors. In other words, a volume in the vicinity (within a threshold distance) of the quantum sensor will tend to affect materials that the quantum sensor senses. When a plurality of quantum sensors are used in an NMR sensing device, a cumulative resolution of the NMR sensing device may be enhanced as data collected using the plurality of quantum sensors should allow a processor to identify changes in wellbore formation layers more accurately.

In an instance when an inductive coil is used in an NMR sensing device, that coil must have a length that is long enough to sense NMR signals with an acceptable NMR signal to noise ratio (SNR). For example, an NMR SNR requirement and limitations of inductive antennas may require that a coil that has least a 12 inch aperture (e.g., a 12 inch long coil) must be used to meet that NMR SNR requirement.

Figure 7:
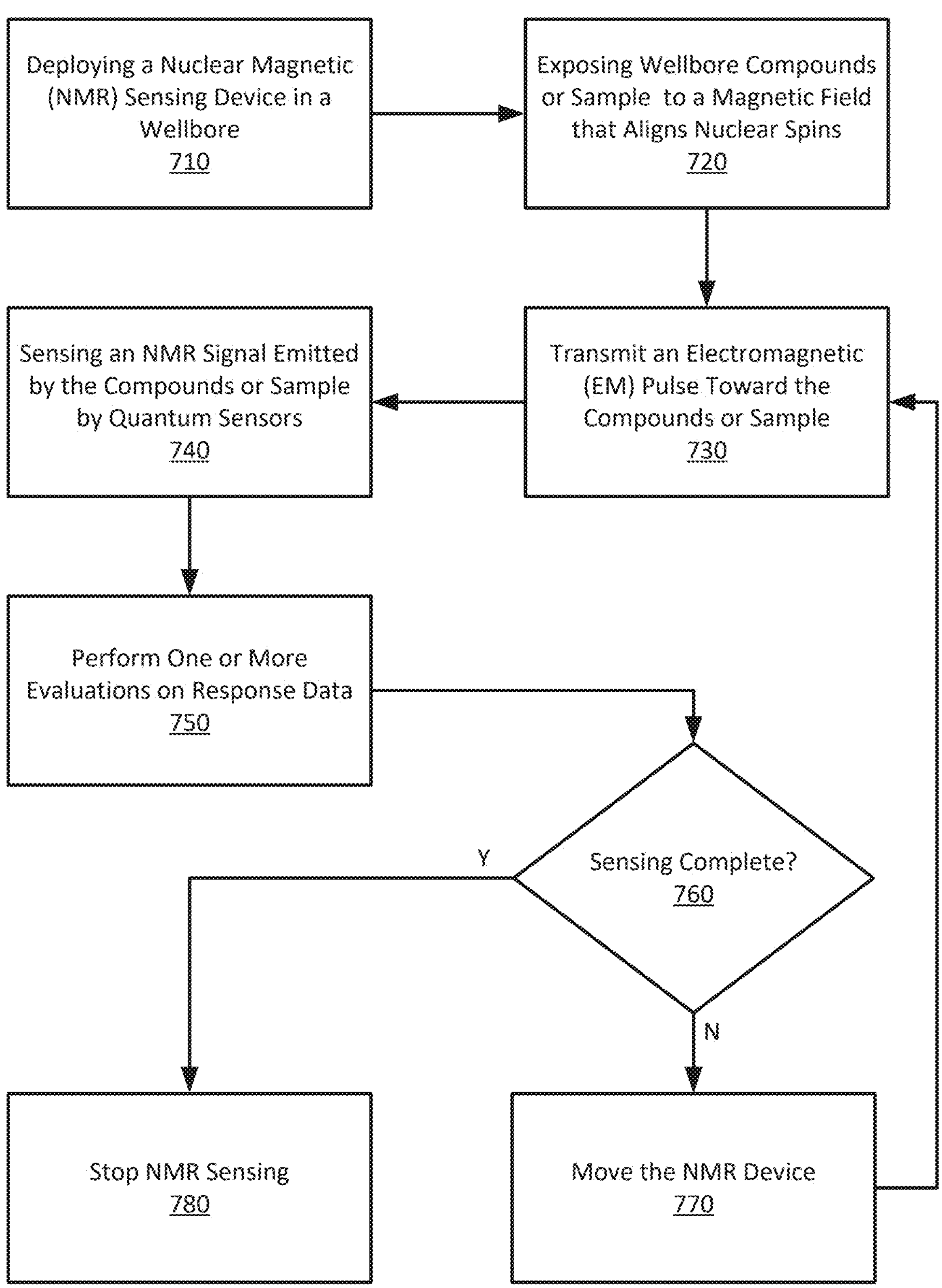
FIG. 7 illustrates actions that may be performed by a nuclear magnetic resonance sensing device, in accordance with various aspects of the subject technology.

In contrast, an atomic magnetometer (quantum sensor) can achieve the same or better SNR with a fraction of the conventional induction coil antenna aperture. For instance, a set of quantum sensors each with a physical linear dimension of 1 inch to 2 inches may be used to detect NMR signals. These sensors may be disposed linearly along an entire sensitive volume. Because of this, numerous quantum sensors may be used to sense NMR signals instead of a single coil. Sensing devices of the present disclosure may use one transmission coil (e.g. a 12 inch long coil) and numerous (e.g., 48) quantum sensors when the quantum sensors have a linear dimension of 1 inch and are arranged in a 4 column, 12 row configuration. This means that each quantum sensor (atomic magnetometer detector) can receive NMR signals in a fraction of the sensitive volume defined by the excitation coil. Collectively, each quantum sensor may sense NMR responses from the entire sensitive volume defined by the excitation coil. Furthermore, each detector's signal can be processed independently to provide more spatially localized formation characteristics such that high-resolution logging can be achieved. FIG. 7 illustrates actions that may be performed by a nuclear magnetic resonance (NMR) sensing device. At block 710 an NMR sensing device may be deployed in a wellbore. This may include lowering the NMR device with a cable, for example, using wireline conveyance 144 of FIG. 1B. In certain instances, the NMR device may be deployed using a tool that has a propulsion device designed to move wellbore tools along a wellbore. Such a propulsion device may include wheels, tracks, or a propeller/impeller. In some instances, the NMR device may be moved down the wellbore using gravity or may move with a flow of wellbore fluids. When wheels or tracks are used, the wheels or tracks may be configured to engage one or more sides of the wellbore and the NMR device may be moved along the wellbore based on motion of the wheels or tracks. When propellers or impellers are used, these propellers or impellers may work much like a propeller of a boat or an impeller of a jet ski. The motion of a propeller or impeller may force wellbore fluids in one direction to force the NMR device to move in a second direction. Motion of the NMR device along the wellbore may allow wellbore fluids to move into and or along sensing surfaces of the NMR sensing device.

At block 720, compounds in a wellbore may be exposed to a magnetic field. Since these compounds are located in a wellbore, they may be referred to as a sample or wellbore sample. This magnetic field may align spins of nuclei of substances included in the sample. As such, the magnetic field may "pre-polarize" a volume of a wellbore that is adjacent to the NMR sensing device. At block 730, one or more electromagnetic (EM) pulses may be transmitted toward the sample. These EM pulses may be pulses of radio frequency (RF) signals that include a magnetic field that disrupts the spins of the nuclei of the sample. Quantum sensors (atomic magnetometers) at the NMR sensing device may then sense NMR signals emitted by the substances included in the sample at block 740. As such, NMR signals may be sensed in response to the transmission of the EM pulses.

Data acquired by the NMR sensing device may be sensed after transmitting a series of pulses in a pulse sequence, for example, using a Car-Purcell-Meiboom-Gill (CPMG) pulse sequence. Multiple echoes of transmitted pulses may be acquired, where each echo may be acquired between a respective recovery pulse (180 degree pulses) in the CPMG pulse sequence. In such instances, a sudden tool movement may affect the NMR in two ways: (1) the NMR sensing device may move away from a volume of strata pre-polarized with the magnetic field and toward a non or insufficiently pre-polarized volume of strata and (2) Moving out of the sensitive volume defined by the excitation pulse during an echo train acquisition. The second problem may affect the signal from a long conventional induction coil, in a more pronounced way than a set of small-dimension quantum sensors (atomic magnetometers). For the latter, as the excitation pulse defines a large sensitive volume, a sudden tool movement may not move all of the quantum sensors out of the sensitive volume defined by the excitation pulse; only some of these sensors may be affected, where others will still in the sensitive volume.

At block 750 one or more evaluations may be performed on the sensed NMR signals or data associated with these NMR signals. As mentioned above, this may include converting the NMR signals into data using an ADC and providing the data to a processor. This processor may execute instructions out of a memory to identify compounds included in the sample based on the evaluations performed at block 750. Determination block 760 may then identify whether a sensing operation is complete. When the sensing operation is not complete, the NMR device may be moved to another location of the wellbore at block 770. Once the NMR device has been moved, additional EM pulses may be transmitted at block 730. When determination block 760 identifies that the sensing operation is complete, the sensing operation may be stopped/terminated at block 780.

Figure 8:
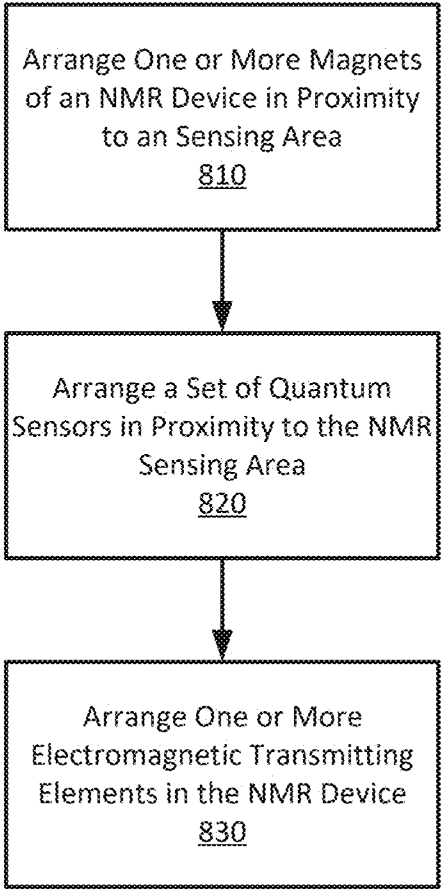
FIG. 8 illustrates actions that may be performed when a nuclear magnetic resonance device that includes quantum sensors is made, in accordance with various aspects of the subject technology.

FIG. 8 illustrates actions that may be performed when a nuclear magnetic resonance (NMR) sensing device that includes quantum sensors is made. At block 810, one or more magnets may be arranged in proximity to a sensing area (e.g., area 580 of FIG. 5). Such a sensing area may be an area that is next to a set of quantum sensors or that is located within an NMR sensing device as discussed in respect to FIG. 5.

At block 820 a set of (one or more) quantum sensors may be arranged in proximity to the NMR sensing area. At block 830 one or more EM transmitting elements may be arranged in the NMR device. Various parts of the NMR device may be arranged according to specific requirements and distances between these parts may be controlled such that the NMR device may operate more efficiently, more repeatably, and/or more accurately.

Once a wellbore device is available for use, it may be deployed when a wellbores is being drilled into the Earth such that subterranean strata or fluids may be tested for concentrations of lithium or other materials. When the wellbore is drilled, water or other fluids from structures that surround the wellbore may flow into a wellbore where an NMR sensing device is deployed. When wellbore fluids include drilling muds or other fluids that are provided to the wellbore by a wellbore operation, NMR enhancing agents may be added to the fluids. An NMR enhancing agent may be characterized as a paramagnetic chemical agent. In some examples, fluids may include mixture of drilling mud and the NMR enhancing agent. During operations the drilling mud infused with the NMR enhancing agent may mix with wellbore fluids such that the NMR device can collect data relating to compounds (e.g., lithium compounds or hydrogen-based compounds) in the wellbore fluids. In certain instances, the infused drilling mud may be directed into formations that surround the wellbore such that data associated with these formations may be collected. As such, the NMR device may be deployed when a "drilling" fluid that includes the NMR enhancing agent is provided to the wellbore. This drilling fluid may include at least a target concentration of the NMR enhancing element. This target concentration may be sufficient to reduce T1 times of lithium according to a sensing rule. When the second fluid is provided to the wellbore, it may be mixed with fluid from the fluid deposits (e.g., the first fluid) when a combined fluid is formed. This mixing may occur when the wellbore is drilled. A drill bit or other tool deployed in the wellbore may be used to mix the drilling fluid with resident wellbore fluids when a combined fluid is formed.

The combined fluid may be exposed to a magnetic field generated by a magnet of the NMR device for a time sufficient to align the spins of lithium nuclei. One or more pulses of RF signal may be transmitted into the combined fluid. Response data may be collected by the NMR device. Multiple different sets of RF signal pulses may be transmitted into the combined fluid and multiple different responses measurements may be made when a set of response data is collected. When NMR measurements are made, the combined fluid may be proximal to the NMR sensing device or quantum sensing elements. A magnet of the NMR device may align spins of lithium nuclei and transmitters of the NMR sensing device may transmit RF pulses into the combined fluid such that the NMR sensing device can collect data. One or more evaluations may be performed on the collected data. These evaluations may identify a concentration of lithium and/or other substances included in the combined fluid.

Actions that may be performed when a sample is tested for lithium concentrations may include combining a first fluid a second fluid. This first fluid may be a fluid found in a wellbore where an NMR sensing device is deployed or in formations that surround the wellbore and the second fluid may be a fluid provided to the wellbore by pumps from the surface. In such an instance, the second fluid may include an NMR enhancing agent. The first and the second fluid may be combined in the wellbore, in formations that surround the wellbore, or both. In one instance, a balanced or underbalanced drilling operation may cause the first fluid to flow from the formation to the wellbore. This may result in stronger NMR signal measurements as the wellbore fluid (the first fluid) may easily mix with the second fluid in the wellbore. In another instance, for example, when an overbalanced drilling process is used, higher pressure caused by the overbalanced drilling operation may push a mud filtrate that includes the NMR enhancer into the formation. In this instance, the second fluid mixes with the first fluid through diffusion and perfusion in the formation. As such, different types of NMR measurements scenarios may be used.

A particular type of NMR measurement scenarios used may be selected based on formation characteristics. This is because, some formation characteristics may not be suitable for mixing fluids inside the wellbore, so in such instances, mixing fluids inside the wellbore may not be appropriate. The mud filtrate mentioned above may include liquid portions of drilling mud and solvents that may be dissolved in the drilling mud. As such penetration by mud filtrated into wellbore formations may help the relaxation time enhancer in the drilling mud move into the wellbore features.

In one instance, an axial symmetric (e.g., mandrel type) NMR logging sensor configuration may be used. In systems and techniques of the present disclosure, the sensitive volume may be located either in a shallow depth of investigation, inside the formation containing the brine or within the borehole. This means that apparatus and techniques of the present disclosure may measure content of lithium in fluids in a wellbore or in rock formations that surround the wellbore. The sensitive volume within the borehole may help as the distance between the logging tool and the sensitive volume is shorter, therefore, both B0 and B1 may be larger for the same type of tool hardware. Furthermore, a well may be drilled using a technique referred to as underbalanced drilling. This may include, yet not be limited to, air drilling. As such, brine in a formation may easily flow from the formation to the wellbore. Therefore, a large fraction of borehole fluid will be the formation brine. The relaxation enhancer may be mixed with drilling fluids (e.g., drilling mud). In the case of air drilling, a small amount of relaxation enhancer agent can be disposed from the logging instrument periodically before measurements to reduce the $^{7}$Li relaxation time such that a number n of repeats may be increased.

The use of a mandrel tool inside of borehole also has an advantage over a side-looking or pad tool in that the sensitive volume is much larger as it covers all 360° surrounding the tool, thus, the sensitive volume is increased. Since The T1 enhancer is used for increasing repetitive data acquisitions, a T1 enhancing element allows a large sensitive volume to be tested. Therefore, a low-field-gradient tool configuration, such as the monopole type or longitudinal dipole type illustrated in FIG. 6 may be very useful. A quantum sensor (QS) and quantum sensor array of magnetometers may be deployed as discussed above. One such application is the use regular NMR coil to transmitting RF energy to the sensitive volume containing lithium brine, either within formation, within borehole, or within lithium brine liquid containing sample tube. The quantum sensing magnetometer or array of magnetometers to detect the NMR signal in response to the excitation. The advantage of using a QS as NMR detection is that usually it may boost the sensitivity of NMR detection. Examples of a QS for NMR detection include an alkali atopic magnetometer and a nitrogen vacancy magnetometer.

Figure 9:
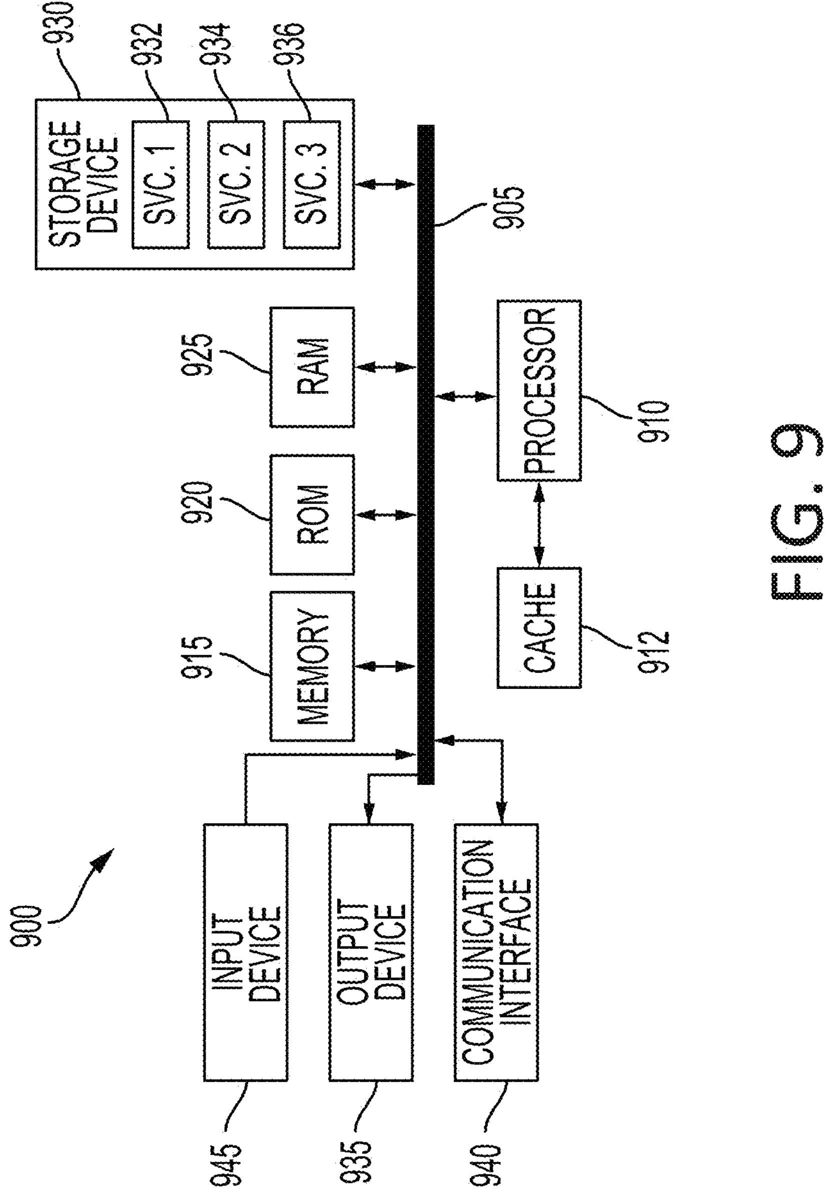
FIG. 9 illustrates an example computing device architecture which can be employed to perform any of the systems and techniques described herein.

FIG. 9 illustrates an example computing device architecture which can be employed to perform any of the systems and techniques described herein. In some examples, the computing device 900 architecture can be integrated with tools described herein. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general-purpose processor and a hardware or software service, such as service 1 932, service 2 934, and service 3 936 stored in storage device 930, configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device, etc. In some instances, multimodal computing devices can enable a user to provide multiple types of input to communicate with the computing device architecture 900. The communications interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include services 932, 934, 936 for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks comprising devices, device components, steps or routines in a method implemented in software, or combinations of hardware and software.

In some instances, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples and aspects thereof, but those skilled in the art will recognize that the application is not limited thereto. Thus, while illustrative examples and aspects of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, examples and aspects of the systems and techniques described herein can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

Where components are described as being “configured to” perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Methods and apparatus of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Such methods may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as “upper,” “upward,” “lower,” “downward,” “above,” “below,” “downhole,” “uphole,” “longitudinal,” “lateral,” and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool.

The term “coupled” is defined as connected, whether directly or indirectly through intervening components, and is not necessarily limited to physical connections. The connection can be such that the objects are permanently connected or releasably connected. The term “outside” refers to a region that is beyond the outermost confines of a physical object. The term “inside” indicates that at least a portion of a region is partially contained within a boundary formed by the object. The term “substantially” is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative Statements of the disclosure include:

Statement 1: An apparatus comprising: one or more magnets that provide a magnetic field that polarizes nuclei of a sensitive volume; an inductive element that transmits an electromagnetic (EM) pulse sequence toward the sensitive volume, wherein the EM pulse sequence is transmitted over a length of the inductive element to stimulate emission of a plurality of nuclear magnetic resonance (NMR) signals from the nuclei of the sensitive volume; a plurality of quantum sensing elements disposed along the length of the inductive element, wherein: each of the plurality of quantum sensing elements sense at least an NMR signal of the plurality of NMR signals based on a quantum sensing element size, and resolution of data sensed by each of the plurality of quantum sensing elements corresponds to the quantum sensing element size; and a first structure that contains the one or more magnets, the inductive element, and the plurality of quantum elements, wherein the first structure is coupled to or part of a wellbore deployment mechanism.

Statement 2: The apparatus of Statement 1, further comprising: a second structure that supports the plurality of quantum sensing elements, wherein: the sensitive volume includes strata of a wellbore, and a frequency of the transmitted EM pulse sequence corresponds to detecting types of nuclei classified as being sensitive to non-proton NMR sensing.

Statement 3: The apparatus of any of Statements 1 or 2, wherein each respective quantum sensing element of the plurality of quantum elements is disposed in a geometric pattern.

Statement 4: The apparatus of Statement 3, wherein: the geometric pattern has four columns and a plurality of rows, each respective quantum sensor of the plurality of quantum sensors is located at a respective location identified by a column number and a row number of the geometric pattern, and the resolution of the sensed data also corresponds to the quantum sensors being disposed in the geometric pattern.

Statement 5: The apparatus of any of Statements 1 through 4, further comprising: a set of electronic circuits electrically coupled to each quantum sensing element of the set of quantum elements.

Statement 6: The apparatus of Statement 5, wherein: the set of electronic circuits includes one or more analog to digital converters (ADCs) that sample the plurality of NMR signals sensed by the set of quantum sensing elements, and the one or more ADCs are coupled to a processor that executes instructions out of a memory to identify materials included in formations of a wellbore based on a cumulative resolution, the cumulative resolution associated with the resolution of the data sensed by each of the plurality of quantum sensing elements.

Statement 7: A method comprising: deploying a nuclear magnetic (NMR) sensing device in a wellbore; exposing nuclei of a sensitive volume to a magnetic field that polarizes the nuclei of the sensitive volume; transmitting an electromagnetic (EM) pulse sequence over a length of an inductive element toward the sensitive volume to stimulate emission of a plurality of nuclear magnetic resonance (NMR) signals from the nuclei of the sensitive volume; and sensing data by each of a plurality of quantum sensing elements disposed along the length of the inductive element, wherein: each of the plurality of quantum sensing elements sense at least an NMR signal of the plurality of NMR signals based on a quantum sensing element size, and resolution of the data sensed by each of the plurality of quantum sensing elements corresponds to the quantum sensing element size.

Statement 8: The method of Statement 7, further comprising: receiving at a set of electronic circuits the plurality of NMR signals sensed by the plurality of quantum elements.

Statement 9: The method of any of Statements 7 or 8, wherein: the set of electronic circuits includes one or more analog to digital converters (ADCs) that sample the plurality of NMR signals sensed by the plurality of quantum sensing elements, and the one or more ADCs are coupled to a processor that executes instructions out of a memory to identify materials included in formations of a wellbore based on a cumulative resolution, the cumulative resolution associated with the resolution of the data sensed by each of the plurality of quantum sensing elements.

Statement 10: any of Statements 7 through 9, further comprising: performing an analysis of data associated with the plurality of NMR signals sensed by the plurality of quantum sensing elements.

Statement 11: The method of Statement 10, further comprising: identifying based on the analysis a type of material included in the sensitive volume, wherein a frequency of the transmitted EM pulse sequence corresponds to detecting types of nuclei classified as being sensitive to non-proton NMR sensing.

Statement 12: The method of Statement 11, further comprising: identifying a concentration of the type of material included in the sensitive volume.

Statement 13: The method of Statement 9, further comprising: providing an NMR enhancing agent to a formation surrounding the wellbore or within the wellbore.

Statement 14: The method of Statement 13, further comprising: performing an analysis of data associated with the plurality of NMR signals sensed by the plurality of quantum elements based on the NMR enhancing agent being provided to the wellbore.

Statement 15: A non-transitory computer-readable storage medium having embodied thereon instructions that when executed by one or more processors cause the one or more processors to: control deployment of a nuclear magnetic (NMR) sensing device in a wellbore; control exposing nuclei of a sensitive volume to a magnetic field that polarizes the nuclei of the sensitive volume; control transmission an electromagnetic pulse sequence over a length of an inductive element toward the sensitive volume to stimulate emission of a plurality of nuclear magnetic resonance (NMR) signals from the nuclei of the sensitive volume; and evaluate data sensed by each of a plurality of quantum sensing elements disposed along the length of the inductive element, wherein: each of the plurality of quantum sensing elements sense at least an NMR signal of the plurality of NMR signals based on a quantum sensing element size, and resolution of the data sensed by each of the plurality of quantum sensing elements corresponds to the quantum sensing element size.

Statement 16: The non-transitory computer-readable storage medium of Statement 15, further comprising: receiving at a set of electronic circuits the plurality of NMR signals sensed by the plurality of quantum elements.

Statement 17: The non-transitory computer-readable storage medium of Statement 16, wherein: the set of electronic circuits includes one or more analog to digital converters (ADCs) that sample the plurality of NMR signals sensed by the plurality of quantum sensing elements, and the one or more ADCs are coupled to the one or more processors that execute instructions out of a memory to identify materials included in formations of a wellbore based on a cumulative resolution, the cumulative resolution associated with the resolution of the data sensed by each of the plurality of quantum sensing elements.

Statement 18: The non-transitory computer-readable storage medium of any of Statements 15-17, wherein the one or more processors execute the instructions to: perform an analysis of data associated with the plurality of NMR signals sensed by the plurality of quantum sensing elements.

Statement 19: The non-transitory computer-readable storage medium of any of Statements 15 through 18, the one or more processors execute the instructions to: identify based on the analysis a type of material included in the sensitive volume, wherein a frequency of the transmitted EM pulse sequence corresponds to detecting types of nuclei classified as being sensitive to non-proton NMR sensing.

Statement 20: The non-transitory computer-readable storage medium of any of Statements 15 through 17, wherein the one or more processors execute the instructions to: identify a concentration of the type of material included in the sensitive volume.

What is claimed is:

1. An apparatus comprising:

one or more magnets that provide a magnetic field that polarizes nuclei of a sensitive volume;

an inductive element that transmits an electromagnetic (EM) pulse sequence toward the sensitive volume, wherein the EM pulse sequence is transmitted over a length of the inductive element to stimulate emission of a plurality of nuclear magnetic resonance (NMR) signals from the nuclei of the sensitive volume;

a plurality of quantum sensing elements disposed along the length of the inductive element, wherein:

each of the plurality of quantum sensing elements sense at least an NMR signal of the plurality of NMR signals based on a quantum sensing element size, and resolution of data sensed by each of the plurality of quantum sensing elements corresponds to the quantum sensing element size; and a first structure that contains the one or more magnets, the inductive element, and the plurality of quantum elements, wherein the first structure is coupled to or part of a wellbore deployment mechanism.

2. The apparatus of claim 1, further comprising:

a second structure that supports the plurality of quantum sensing elements, wherein:

the sensitive volume includes strata of a wellbore, and a frequency of the transmitted EM pulse sequence corresponds to detecting types of nuclei classified as being sensitive to non-proton NMR sensing.

3. The apparatus of claim 1, wherein each respective quantum sensing element of the plurality of quantum elements is disposed in a geometric pattern.

4. The apparatus of claim 3, wherein:

the geometric pattern has four columns and a plurality of rows, each respective quantum sensor of the plurality of quantum sensors is located at a respective location identified by a column number and a row number of the geometric pattern, and the resolution of the sensed data also corresponds to the quantum sensors being disposed in the geometric pattern.

5. The apparatus of claim 1, further comprising:

a set of electronic circuits electrically coupled to each quantum sensing element of the set of quantum elements.

6. The apparatus of claim 5, wherein:

the set of electronic circuits includes one or more analog to digital converters (ADCs) that sample the plurality of NMR signals sensed by the set of quantum sensing elements, and the one or more ADCs are coupled to a processor that executes instructions out of a memory to identify materials included in formations of a wellbore based on a cumulative resolution, the cumulative resolution associated with the resolution of the data sensed by each of the plurality of quantum sensing elements.

7. A method comprising:

deploying a nuclear magnetic (NMR) sensing device in a wellbore;

exposing nuclei of a sensitive volume to a magnetic field that polarizes the nuclei of the sensitive volume;

transmitting an electromagnetic (EM) pulse sequence over a length of an inductive element toward the sensitive volume to stimulate emission of a plurality of nuclear magnetic resonance (NMR) signals from the nuclei of the sensitive volume; and sensing data by each of a plurality of quantum sensing elements disposed along the length of the inductive element, wherein:

each of the plurality of quantum sensing elements sense at least an NMR signal of the plurality of NMR signals based on a quantum sensing element size, and resolution of the data sensed by each of the plurality of quantum sensing elements corresponds to the quantum sensing element size.

8. The method of claim 7, further comprising:
receiving at a set of electronic circuits the plurality of NMR signals sensed by the plurality of quantum elements.

9. The method of claim 8, wherein:
the set of electronic circuits includes one or more analog to digital converters (ADCs) that sample the plurality of NMR signals sensed by the plurality of quantum sensing elements, and
the one or more ADCs are coupled to a processor that executes instructions out of a memory to identify materials included in formations of a wellbore based on a cumulative resolution, the cumulative resolution associated with the resolution of the data sensed by each of the plurality of quantum sensing elements.

10. The method of claim 9, further comprising:
providing an NMR enhancing agent to a formation surrounding the wellbore or within the wellbore.

11. The method of claim 10, further comprising:
performing an analysis of data associated with the plurality of NMR signals sensed by the plurality of quantum elements based on the NMR enhancing agent being provided to the wellbore.

12. The method of claim 7, further comprising:
performing an analysis of data associated with the plurality of NMR signals sensed by the plurality of quantum sensing elements.

13. The method of claim 12, further comprising:
identifying based on the analysis a type of material included in the sensitive volume, wherein a frequency of the transmitted EM pulse sequence corresponds to detecting types of nuclei classified as being sensitive to non-proton NMR sensing.

14. The method of claim 13, further comprising:
identifying a concentration of the type of material included in the sensitive volume.

15. A non-transitory computer-readable storage medium having embodied thereon instructions that when executed by one or more processors cause the one or more processors to:
control deployment of a nuclear magnetic (NMR) sensing device in a wellbore;
control exposing nuclei of a sensitive volume to a magnetic field that polarizes the nuclei of the sensitive volume;
control transmission an electromagnetic pulse sequence over a length of an inductive element toward the sensitive volume to stimulate emission of a plurality of nuclear magnetic resonance (NMR) signals from the nuclei of the sensitive volume; and
evaluate data sensed by each of a plurality of quantum sensing elements disposed along the length of the inductive element, wherein:
each of the plurality of quantum sensing elements sense at least an NMR signal of the plurality of NMR signals based on a quantum sensing element size, and
resolution of the data sensed by each of the plurality of quantum sensing elements corresponds to the quantum sensing element size.

16. The non-transitory computer-readable storage medium of claim 15, further comprising:
receiving at a set of electronic circuits the plurality of NMR signals sensed by the plurality of quantum elements.

17. The non-transitory computer-readable storage medium of claim 16, wherein:
the set of electronic circuits includes one or more analog to digital converters (ADCs) that sample the plurality of NMR signals sensed by the plurality of quantum sensing elements, and
the one or more ADCs are coupled to the one or more processors that execute instructions out of a memory to identify materials included in formations of a wellbore based on a cumulative resolution, the cumulative resolution associated with the resolution of the data sensed by each of the plurality of quantum sensing elements.

18. The non-transitory computer-readable storage medium of claim 15, wherein the one or more processors execute the instructions to: perform an analysis of data associated with the plurality of NMR signals sensed by the plurality of quantum sensing elements.

19. The non-transitory computer-readable storage medium of claim 18, wherein the one or more processors execute the instructions to:
identify based on the analysis a type of material included in the sensitive volume, wherein a frequency of the transmitted EM pulse sequence corresponds to detecting types of nuclei classified as being sensitive to non-proton NMR sensing.

20. The non-transitory computer-readable storage medium of claim 15, wherein the one or more processors execute the instructions to:
identify a concentration of the type of material included in the sensitive volume.

* * * * *